United States Patent [19]

Ooishi

[11] Patent Number: 5,181,122

[45] Date of Patent: Jan. 19, 1993

[54] DISPLAY DEVICE FOR DISPLAYING A WIDE PICTURE

[75] Inventor: Toshimitsu Ooishi, Kobe, Japan

[73] Assignee: Konami Kogyo Kabushiki Kaisha, Kobe, Japan

[21] Appl. No.: 895,207

[22] Filed: Jun. 8, 1992

Related U.S. Application Data

[63] Continuation of Ser. No. 685,805, Apr. 15, 1991, abandoned.

[30] Foreign Application Priority Data

Jun. 26, 1990 [JP] Japan .................................. 2-169288

[51] Int. Cl.⁵ .............................................. H04N 5/74
[52] U.S. Cl. ..................................... 358/238; 358/237; 353/37
[58] Field of Search ............... 358/237, 238, 231, 60, 358/236, 230, 56, 88, 87, 254; 353/31, 34, 37; 340/705, 720

[56] References Cited

U.S. PATENT DOCUMENTS

| | | | |
|---|---|---|---|
| 2,301,826 | 11/1942 | Steüdal et al. | 358/88 |
| 3,715,619 | 2/1973 | Cotter | 358/236 |
| 4,190,856 | 2/1980 | Ricks | 358/88 |
| 4,191,456 | 3/1980 | Hong et al. | 353/37 |
| 4,373,169 | 2/1983 | Burkam | 358/87 |
| 4,755,868 | 7/1988 | Hodges | 358/60 |
| 5,122,790 | 6/1992 | Yasuda et al. | 358/236 |

FOREIGN PATENT DOCUMENTS

| | | |
|---|---|---|
| 48-25678 | 3/1973 | Japan . |
| 58-219881 | 2/1983 | Japan . |
| 0160190 | 6/1989 | Japan . |
| 8605112 | 7/1986 | PCT Int'l Appl. . |
| 2145897 | 4/1985 | United Kingdom . |

Primary Examiner—James J. Groody
Assistant Examiner—Jeffrey S. Murrell
Attorney, Agent, or Firm—Jordan and Hamburg

[57] ABSTRACT

A display device for displaying a wide picture includes a main screen on which the wide picture is to be produced, one picture projector carrying a picture generation unit having a first screen facing in a first direction, and a first picture transmission for transmitting a picture produced on the first screen to the main screen, another picture projector carrying a picture generation unit having a second screen facing in a second direction opposite to the first direction, and a second picture transmission for transmitting a picture produced on the second screen to the main screen, and the one picture projector and the another picture projector being alternately juxtaposed one after another. A continuous wide picture consisting of a picture on the first screen and a picture on the second screen is produced over the main screen.

6 Claims, 7 Drawing Sheets

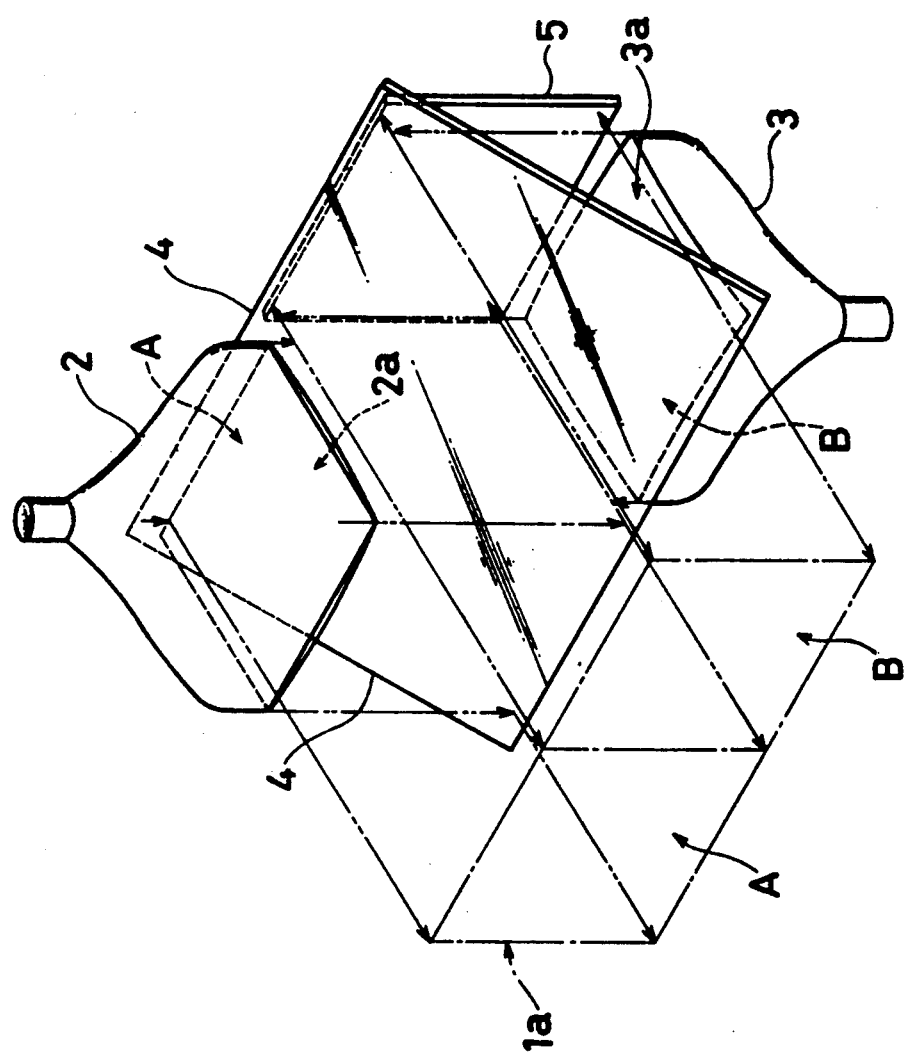

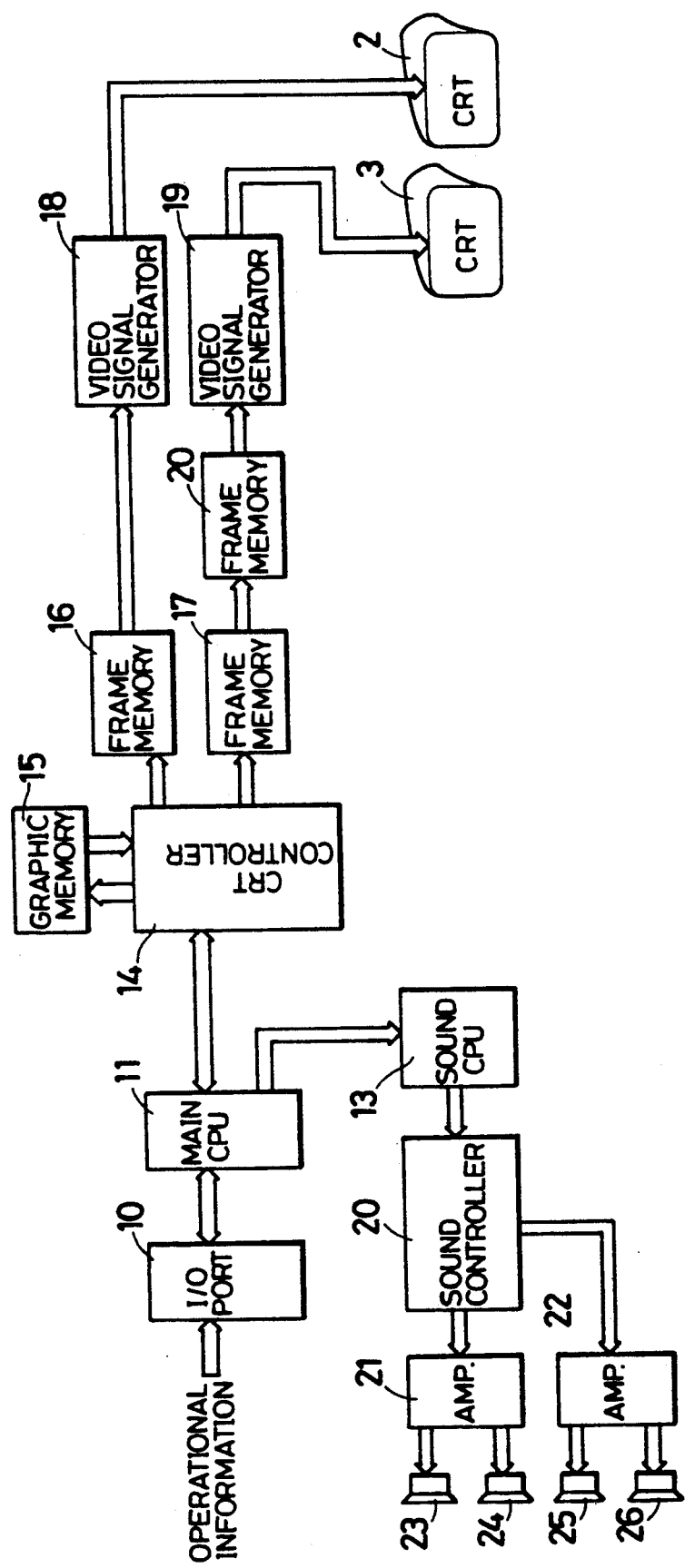

DISPLAY DEVICE FOR DISPLAYING A WIDE PICTURE

This application is a continuation of application Ser. No. 07/685,805, filed Apr. 15, 1991, now abandoned.

BACKGROUND OF THE INVENTION AND RELATED ART STATEMENT

This invention relates to a display device, particularly to a display device having a plurality of picture generation units to display a continuous wide picture consisting of pictures from the picture generation units.

A computerized visual game machine (hereinafter referred to as "TV game machine") has been known which has a display device using a plurality of cathode ray tubes (hereinafter referred to as "CRT") as picture generation unit and mirrors to produce panoramic picture so that the player can feel more dynamic and realistic atmosphere. Such a display device can be seen in Japanese Unexamined Utility Model Publication No. 48-25678, and Japanese Unexamined Patent Publication No. 58-219881, for example.

In a display device using a plurality of CRTs, it has been seen that if CRTs are arranged in contact with one another, joining lines appear in a combined picture, which consequently provide a less dynamic atmosphere. In the display device of the above-mentioned publications, to eliminate such a joining line, CRTs are arranged in a rearwise direction or a sidewise direction of the machine with an appropriate space being kept between one another.

However, the arrangement of CRTs in the rearwise direction gives a TV game machine a greater depth. The arrangement of CRTs in the sidewise direction gives a TV game machine a greater width. Consequently, such a TV game machine requires a larger installation space.

It is usual that amusement arcade business desires to install in a limited space as many machines as possible. However, a smaller number of TV machines can be installed because of having greater depth or width. In addition, it could be seen that TV game machines of an increased size make transportation cumbersome.

SUMMARY OF THE INVENTION

It is an object of the present invention to provide a display device for displaying a wide picture which makes it possible to assure a reduced space for installation, and to produce a continuous wide picture without involving any joining line.

A display device for displaying a wide picture of the present invention comprises a main screen over which the wide picture is to be produced, one picture projector means including a picture generation unit having a first screen facing in a first direction, and a first picture transmission for transmitting a picture produced on the first screen to the main screen, another picture projector means including a picture generation unit having a second screen facing in a second direction opposite to the first direction, and a second picture transmission for transmitting a picture produced on the second screen to the main screen, with the first picture projector and the second picture projector being arranged so that an image from the first picture projector is displayed on the main screen in non-overlapping juxtaposition to an image from the second picture projector.

A picture produced on the first screen is transmitted to the main screen by the first picture transmission, and a picture produced on the second screen is transmitted to the main screen by the second picture transmission. The both transmitted pictures are combined on the main screen to produce a continuous wide picture.

Also, the one picture projector and the another picture projector are alternately juxtaposed in the opposite directions, so that a reduced space is necessary to install the display device.

The above and other objects, features and advantages of the present invention will become more apparent upon a reading of the following detailed description and drawings.

BRIEF DESCRIPTION OF THE DRAWINGS

FIG. 3 is a perspective view showing an arrangement of the first display device;

FIG. 4 is a block diagram showing an overall construction of a control system for the TV game machine of FIG. 1;

DETAILED DESCRIPTION OF PREFERRED EMBODIMENTS OF THE INVENTION

Figure 1:
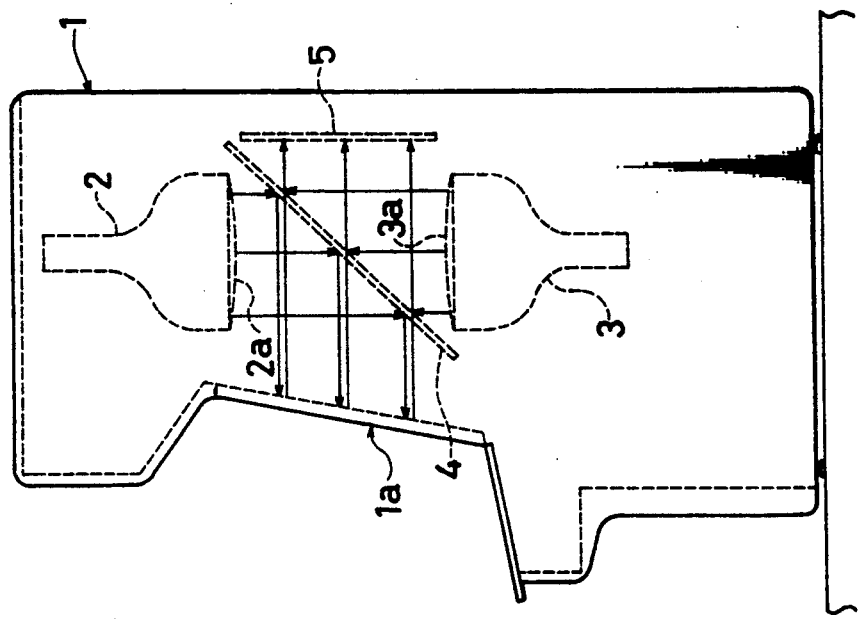
FIG. 1 is a front elevation view of a TV game machine carrying a first display device of the present invention.
Figure 2:
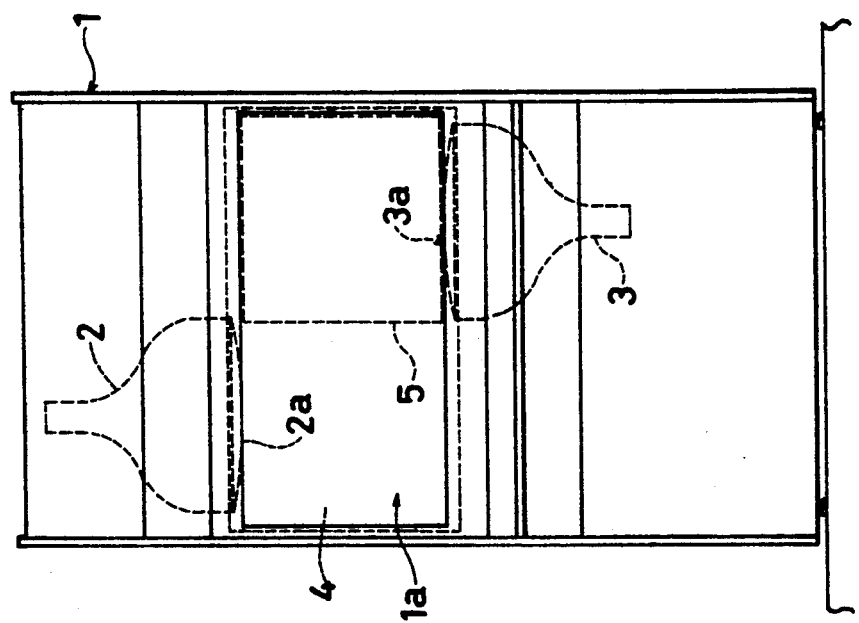
FIG. 2 is a side elevation view of the TV game machine of FIG. 1.

A first embodiment of the present invention will be described with reference to FIGS. 1 to 3 showing a TV game machine 1 provided with two CRTs 2, 3, and mirrors 4, 5. In FIGS. 1 and 2, the two CRTs 2, 3 are illustrated by broken lines. An actuator lever, switches and the like which are provided on a front portion of the TV game machine 1 are omitted for clarity in these figures.

The CRT 2 is disposed in an upper portion in a left side of the TV game machine 1 with its screen 2a facing downward. The CRT 3 is disposed in a lower portion in a right side of the TV game machine 1 with its screen 3a facing upward. Between the two CRTs 2 and 3 is provided the mirror 4 which is a half reflector mirror having an appropriate transmittance, e.g., 50%. Also, the mirror 4 is inclined relative to a plane parallel to the screens 2a and 3a which are held in horizontal planes respectively. The mirror 4 is in the form of a rectangle having such a size as to cover both screens 2a and 3a.

The mirror 5 is disposed behind a right half portion of the inclined mirror 4 and in a position rearer than the rear end of the screen 3a. The mirror 5 is held in a vertical position. Also, the mirror 5 has a transmittance of zero or almost zero, i.e., a full reflector mirror, and an area greater than that of the screen 3a. Also, a smoke screen 1a is provided in a front position of the TV game machine 1. The smoke screen 1a is made of a semitransparent material. A wide picture, a combination of a picture from the screen 2a and a picture from the screen 3a, is projected over the smoke screen 1a by way of the half reflector mirror 4 and the mirror 5. The CRTs 2, 3, half reflector mirror 4, and full reflector mirror 5 are placed in such an arrangement that a wide picture can be projected over the smoke screen 1a without involving any joining line. Specifically, the CRTs 2, 3 are placed in such positions that the right edge of the screen 2a and the left edge of the screen 3a come into a common vertical plane.

Light ways producing a wide picture of the first embodiment will be described with reference to FIGS. 2 and 3. Light of a picture A produced over the screen 2a of the CRT 2 is reflected by a left half portion of the half reflector mirror 4 to the smoke screen 1a, so that the picture A is projected over a left half portion of the smoke screen 1a. On the other hand, light of a picture B produced over the screen 3a of the CRT 3 is reflected by the right half portion of the half reflector mirror 4 to the full reflector mirror 5 which in turn reflects the total light to the smoke screen 1a through the half reflector mirror 4, so that the picture B is projected over the right half portion of the smoke screen 1a. Consequently, the pictures A and B are continuously combined over the smoke screen 1a to produce a wide picture over the smoke screen 1a.

It is to be noted that in the first embodiment, the combination of the CRT 2 and the left half portion of the half reflector mirror 4 constitutes one picture projector, and the combination of the CRT 3, the right half portion of the half reflector mirror 4, and the full reflector mirror 5 constitutes another picture projector.

Also, it will be apparent that the left half portion of the half reflector mirror 4 may be replaced with a full reflector mirror.

Next, an overall construction of a control system for the TV game machine 1 will be described with reference to FIG. 4. Indicated at 10 is an input/output device for providing operational information to a main CPU 11. The operational information is input by the actuator lever and switches provided on the front panel, but not shown in the drawings.

In accordance with the operational information, the main CPU 11 sends a sound control signal to a sound CPU 13 and a CRT control signal to a CRT controller 14. In response to the CRT control signal from the main CPU 11, the CRT controller 14 reads out a necessary picture signal from a graphic memory 15, and then outputs the necessary picture signal to each of frame memories 16, 17. The frame memories 16, 17 are respectively adopted for storing the picture signal from the CRT controller 14. Further, a frame memory 20 is provided to compensate for a time difference between a picture signal for the CRT 2 and a picture signal for the CRT 3. The time difference occurs owing to the fact that the picture signal for the CRT 2 and the picture signal for the CRT 3 are alternately generated. The picture signal is in the form of a digital signal.

Indicated at 18 is a video signal generator for the CRT 2. The video signal generator 18 receives a picture signal from the frame memory 16 and converts the picture signal into a video signal which is in the form of an analog signal. The video signal is sent to the CRT 2. Indicated at 19 is a video signal generator for the CRT 3. The video signal generator 19 receives a picture signal from the frame memory 20 and converts the picture signal into a video signal which is in turn sent to the CRT 3. Consequently, pictures are produced over the screen 2a of the CRT 2 and the screen 3a of the CRT 3 in accordance with the video signals from the video signal generators 18 and 19, and are then projected over the smoke screen 1a by the way of the half reflector mirror 4 and the mirror 5 so that a continuous wide picture is produced over the smoke screen 1a without involving any joining line.

In accordance with the sound control signal from the main CPU 11, the sound CPU 13 sends a control signal and a sound signal to a sound controller 20. The sound controller 20 controls the amplification degrees of amplifiers 21 and 22 in accordance with the control signal from the sound CPU 13. Also, the sound controller 20 sends the sound signal to the amplifiers 21 and 22. The amplifiers 21 and 22 amplify the sound signal in accordance with the set amplification degrees, and send the amplified sound signal to speakers 23, 24, 25, and 26 which in turn convert the sound signal to sounds.

Figure 6:
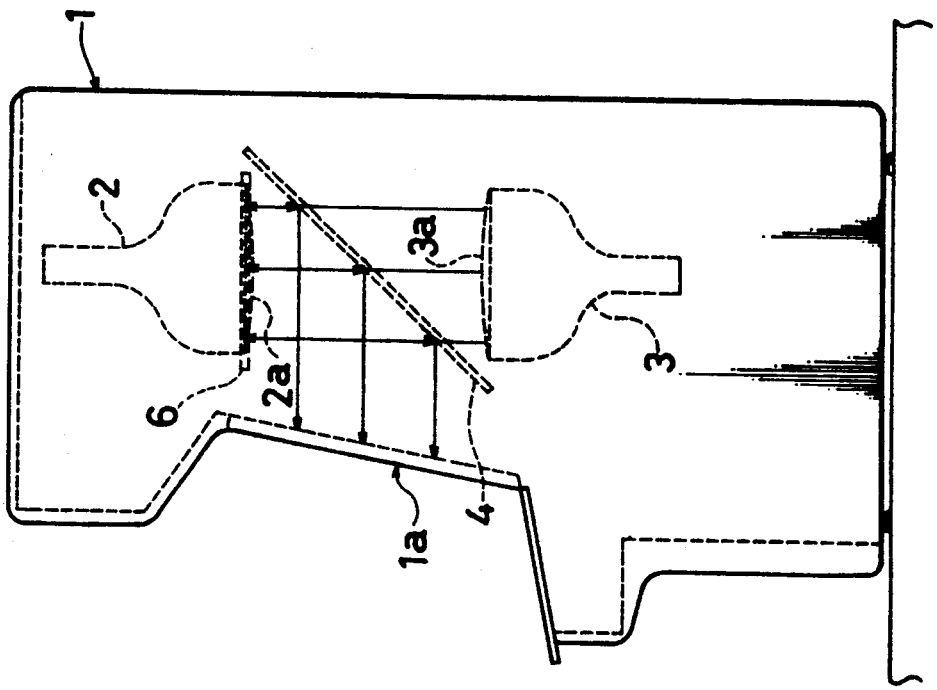
FIG. 6 is a side elevation view of the TV game machine of FIG. 5.
Figure 5:
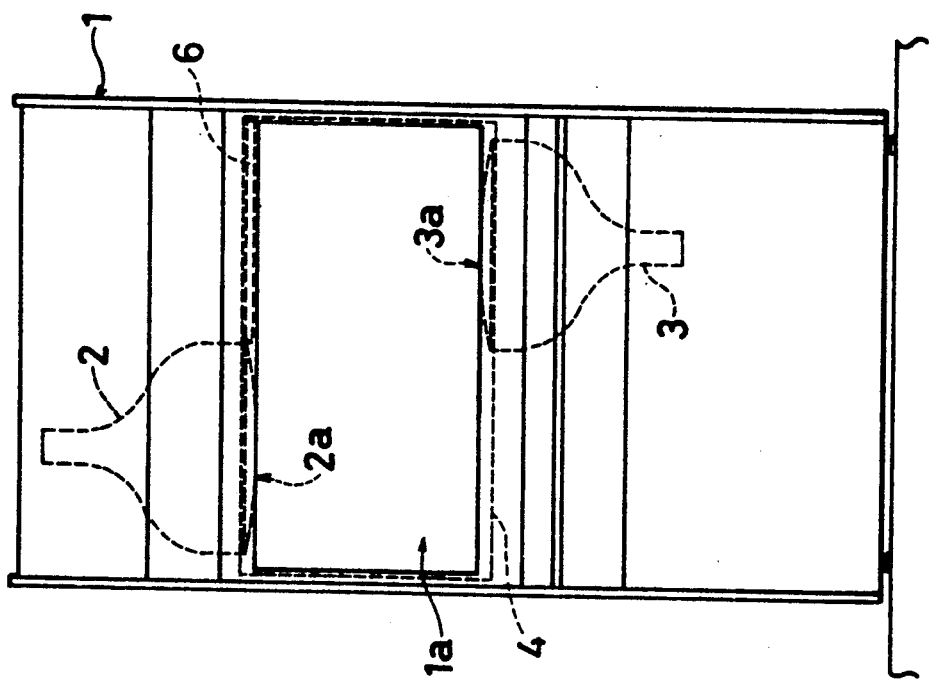
FIG. 5 is a front elevation view of a TV game machine carrying a second display device of the present invention.
Figure 7:
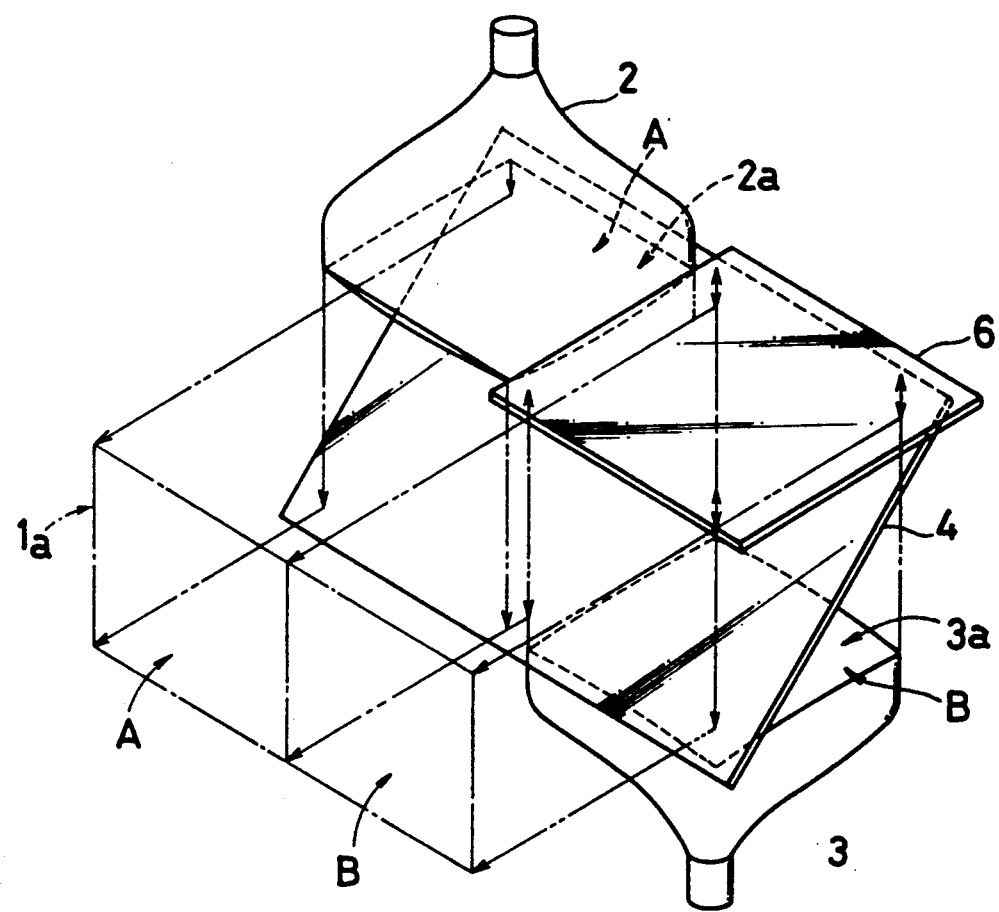
FIG. 7 is a perspective view showing an arrangement of the second display device.

A second embodiment of the present invention will be described with reference to FIGS. 5 TO 7. A TV game machine carrying the second display device is substantially the same as that described in connection with FIGS. 1 to 3. Therefore, reference numerals designating corresponding parts are the same as those in FIGS. 1 to 3.

Two CRTs 2, 3 are provided in the TV game machine 1. The CRT 2 is disposed in an upper portion in a left side of the TV game machine 1 with its screen 2a facing downward. The CRT 3 is disposed in a lower portion in a right side of the TV game machine 1 with its screen 3a facing upward. Between the two CRTs 2 and 3 is provided a half reflector mirror 4 inclined relative to a horizontal plane parallel to the screens 2a and 3a, e.g., 45 degrees. The screens 2a, 3a are held in horizontal positions. The mirror 4 is in the form of a rectangle having such a size as to cover the screens 2a and 3a. To eliminate a joining line, also, the CRTs 2, 3 are disposed in such a way that the right edge of the screen 2a and the left edge of the screen 3a come into a common vertical plane.

A mirror 6 is disposed above a right half portion of the inclined mirror 4 and faces the screen 3a of the CRT 3. The mirror 6 is held in a horizontal position, and has an area greater than the screen 3a. The mirror 6 is a full reflector mirror having a transmittance of zero or almost zero. Also, a smoke screen 1a made of a semitransparent material is provided in a front position of the TV game machine 1 as the first embodiment.

In the screen embodiment, the combination of the CRT 2 and the left half portion of the half reflector mirror 4 constitutes one picture projector, and the combination of the CRT 3, the right half portion of the half reflector mirror 4, and the full reflector mirror 6 constitutes another picture projector. Also, it will be apparent that the left half portion of the half reflector mirror 4 may be replaced with a full reflector mirror.

Next, light ways of the second embodiment will be described with reference to FIGS. 6 and 7. Light of a picture A produced over the screen 2a of the CRT 2 is reflected by a left half portion of the half reflector mirror 4 to the smoke screen 1a, so that the picture A is projected over a left half portion of the smoke screen 1a. On the other hand, light of a picture B produced over the screen 3a of the CRT 3 is transmitted through the right half portion of the half reflector mirror 4 to the full reflector mirror 6 which in turn reflects the total light to the half reflector mirror 4. The half reflector mirror 4 reflects the light to the smoke screen 1a. Consequently, the picture B is projected over the right half portion of the smoke screen 1a. The pictures A and B are continuously combined over the smoke screen 1a to produce a wide picture over the smoke screen 1a.

Figure 8:
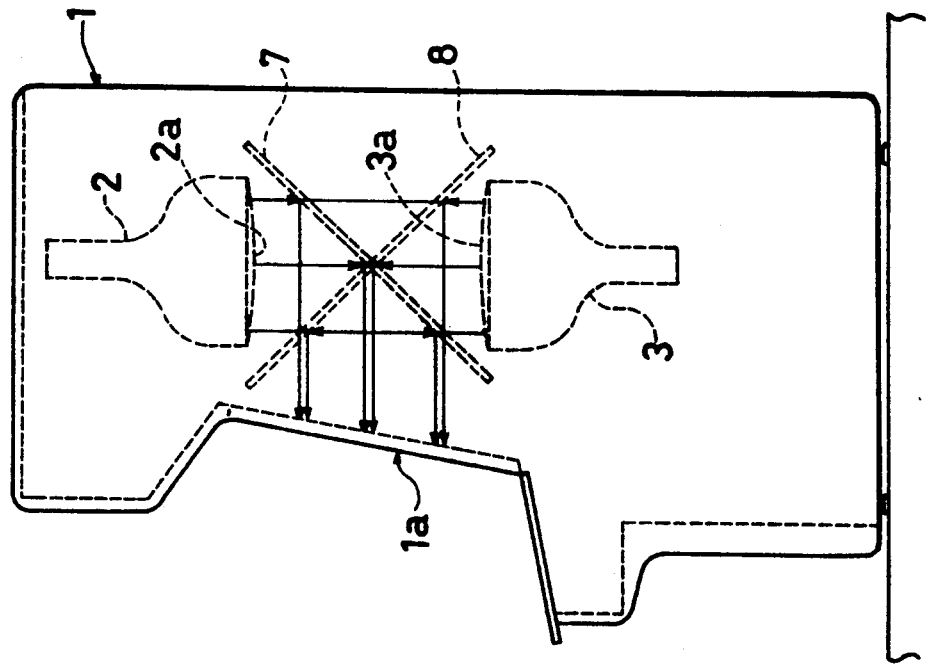
FIG. 8 is a front elevation view of a TV game machine carrying a third display device of the present invention.
Figure 9:
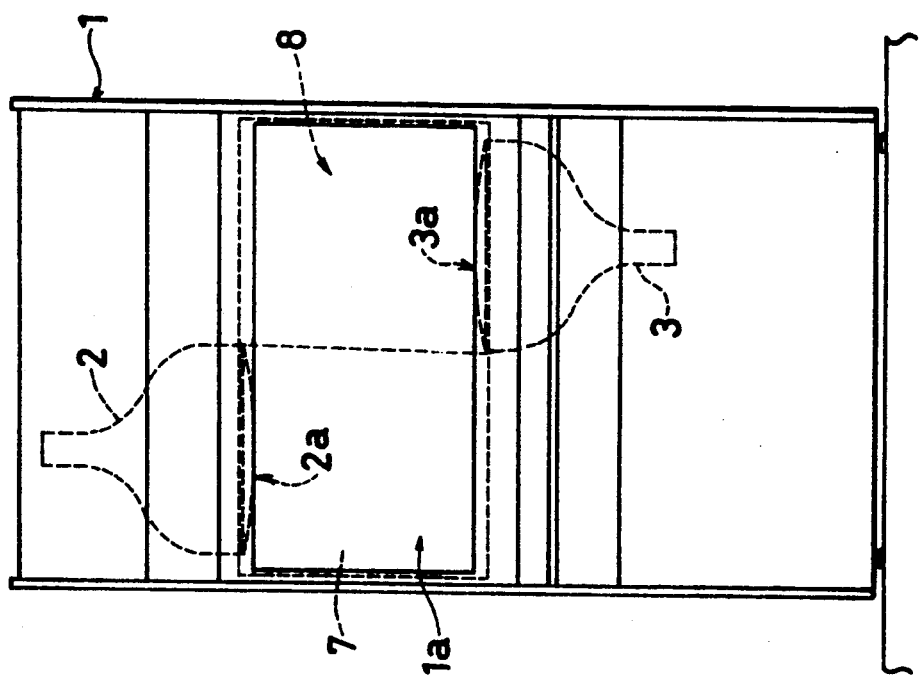
FIG. 9 is a side elevation view of the TV game machine of FIG. 8.
Figure 10:
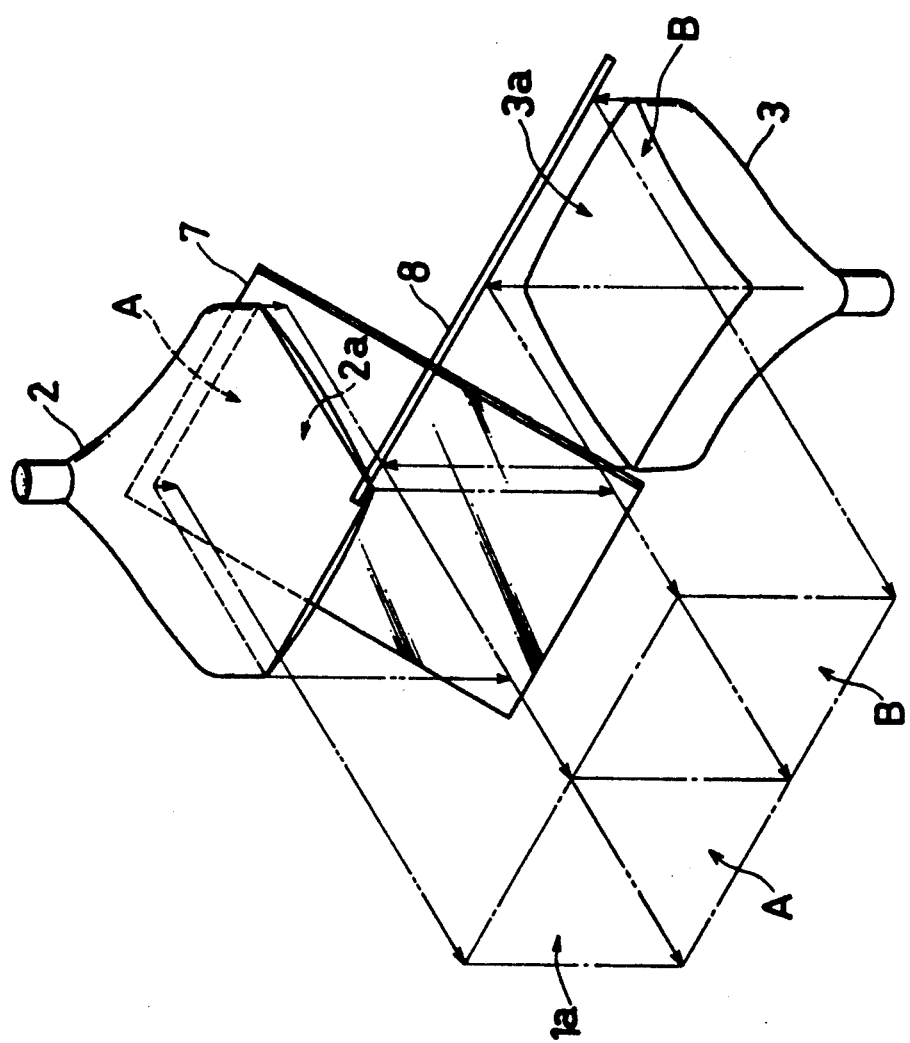
FIG. 10 is a perspective view showing an arrangement of the third display device.

A third embodiment of the present invention will be described with reference to FIGS. 8 to 10. A TV game machine carrying the third display device is substantially the same as that described with reference to FIGS. 1 to 3. Accordingly, like parts are indicated at like reference numerals.

Two CRTs 2, 3 are provided in the TV game machine 1. The CRT 2 is disposed in an upper portion in a left side of the TV game machine 1 with its screen 2a facing downward. The CRT 3 is disposed in a lower portion in a right side of the TV game machine 1 with its screen 3a facing upward. The screens 2a, 3a are held in horizontal positions. Also, the right edge of the screen 2a and the left edge of the screen 3a are held in a common vertical plane to eliminate a joining line.

Under the CRT 2 is provided a mirror 7 inclined relative to a horizontal plane parallel to the screens 2a and 3a, e.g., 45 degrees, so that the reflecting surface of the mirror 7 faces the screen 2a. The mirror 7 is in the form of a rectangle having such a size as to cover the screen 2a. On the other side, above the CRT 3 is provided a mirror 8 inclined relative to the horizontal plane so that the reflecting surface of the mirror 8 faces the screen 3a. The mirrors 7 and 8 have a transmittance of zero or almost zero, that is the mirrors 7, 8 are full reflector mirrors. The inclination of the mirror 8 is exactly opposite to the inclination of the mirror 7. The mirror 8 is similarly in the form of rectangle having such a size as to cover the screen 3a. Further, a smoke screen 1a made of a semitransparent material is provided in a front position of the TV game machine 1 as the first embodiment.

In the third embodiment, the combination of the CRT 2 and the mirror 7 constitutes one picture projector, and the combination of the CRT 3 and the mirror 8 constitutes another picture projector.

Next, light ways of the third embodiment will be described with reference to FIGS. 9 and 10. Light of a picture A produced over the screen 2a of the CRT 2 is reflected by the mirror 7 to the smoke screen 1a, so that the picture A is projected over a left half portion of the smoke screen 1a. On the other hand, light of a picture B produced over the screen 3a of the CRT 3 is reflected by the mirror 8 to the smoke screen 1a, so that picture B is projected over the right half portion of the smoke screen 1a. The pictures A and B are continuously combined over the smoke screen 1a to produce a continuous wide picture over the smoke screen 1a.

It is to be noted that the smoke screen 1a made of semitransparent material has advantageous effects of diffusing the light from the screens 2a, 3a to render the qualities of the pictures A and B uniform, and of giving the player only a wide picture without exposing the inside of the TV machine 1 to the player's eyes.

Also, although two picture projectors are provided in the above-mentioned embodiments, according to the present invention, three or more picture projectors may be provided. In this case, picture projectors are alternately disposed in upper portions and lower portions. Further, although picture projectors are alternately juxtaposed in a vertical plane in the above embodiments, picture projectors may be alternately juxtaposed in a horizontal plane.

Moreover, a display device of the present invention can be used for flight simulator apparatus, navigation simulator apparatus or the like.

Finally, although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A display device for displaying a wide picture comprising:
   a) a main screen over which the wide picture is to be produced;
   b) first picture projector means for producing a first picture, said first picture projector means including a picture generation unit having a first screen extending in a first plane and facing in a first direction;
   c) second picture projector means for producing a second picture, said second picture projector means including a picture generation unit having a second screen extending in a second plane which is parallel to said first plane and facing in a second direction opposite to the first direction, the second plane being spaced from said first plane along said first and second directions;
   d) picture transmission means for transmitting pictures produced on the first and second screens to the main screen, the picture transmission means being positioned between said first and second planes, said picture transmission means including:
      i) first mirror means for:
         (A) reflecting light from the first screen to the main screen, and
         (B) transmitting light therethrough from the second screen and for reflecting said transmitted light that is reflected back to said first mirror means, to the main screen, said first mirror means being inclined with respect to the first direction, and
      ii) second mirror means for reflecting light transmitted from said second screen through said first mirror means back to said first mirror means; and
   e) the first picture projector means and the second picture projector means being arranged so that an image from said first picture projector means is displayed on said main screen in non-overlapping juxtaposition to an image from said second picture projector means.

2. A display device according to claim 1 wherein the first mirror means is inclined at 45 degrees to said first direction.

3. A display device for displaying a wide picture comprising:
   a) a main screen over which the wide picture is to be produced;
   b) first picture projector means for producing a first picture and for transmitting the first picture to said main screen, said first picture projector means including a picture generation unit having:
      i) a first screen extending in a first plane and facing in a first direction, and ii) first picture transmission means for transmitting a picture produced on the first screen to the main screen, the first picture transmission means including first mirror means inclined with respect to the first direction for reflecting light from the first screen to the main screen;

c) second picture projector means for producing a second picture and for transmitting the second picture to said main screen, said second picture projector means including a picture generation unit having:

i) a second screen extending in a second plane which is parallel to said first plane and facing in a second direction opposite to the first direction, the second plane being spaced from said first plane along said first and second directions, and ii) second picture transmission means for transmitting a picture produced on the second screen to the main screen, the second picture transmission means including second mirror means inclined with respect to the second direction for reflecting light from the second screen to the main screen, with the direction of inclination of said second mirror means being at an opposite inclination to the inclination of said first mirror means; and d) the first picture projector means and the second picture projector means being arranged so that an image from said first picture projector means is displayed on said main screen in non-overlapping juxtaposition to an image from said second picture projector means.

4. A display device according to claim 3 wherein the mirror means of the first picture transmission means and the mirror means of the second picture transmission means are full reflector mirrors.

5. A display device according to claim 3 wherein the mirror means of the first picture transmission means and the mirror means of the second picture transmission means are inclined at 45 degrees.

6. A display device according to claim 2 wherein said first mirror means is comprised of a single, integral mirror.

* * * * *